Feb. 8, 1966 R. F. GLEASON ETAL 3,233,459
TEMPERATURE TELLTALE
Filed June 11, 1963
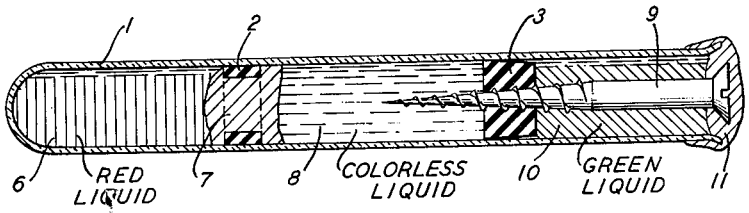
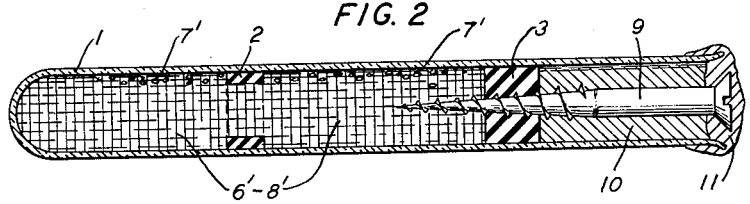
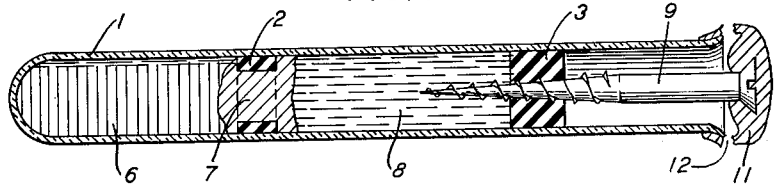
 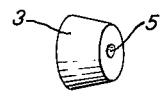
INVENTORS R. F. GLEASON
T. C. LOOMIS
P. A. YEISLEY
BY *B. F. Stoddard*
ATTORNEY

United States Patent Office 3,233,459
Patented Feb. 8, 1966

3,233,459
TEMPERATURE TELLTALE
Robert F. Gleason, Summit, and Thomas C. Loomis and Paul A. Yeisley, Colonia, N.J., assignors to Bell Telephone Laboratories, Incorporated, New York, N.Y., a corporation of New York
Filed June 11, 1963, Ser. No. 287,091
4 Claims. (Cl. 73—358)

This invention relates to an improved temperature telltale for indicating the occurrence of a temperature outside an assigned thermal range and, more particularly, to an improved temperature telltale for providing a plurality of indications of the occurrence of either a rise in temperature above an assigned upper thermal point or a drop in temperature below an assigned lower thermal point.

The invention is useful for monitoring various types of equipment which may be adversely affected when subjected to temperatures that are outside an assigned thermal range. For example, repeaters and equalizers manufactured for use in underwater communication cables contain components which become damaged when they are exposed to excessively high or low temperatures.

After being built in a factory, these repeaters and equalizers are packed in crates and are transported to various parts of the world for installation in underwater cables. Their transportation routes usually extend over long distances and may pass through two or more of the earth's temperature zones where excessively high or low temperatures may be encountered. If extreme temperature conditions should damage any of the repeaters and equalizers, they would not function properly when connected into a cable. Therefore it is important that this damage be discovered before the repeaters and equalizers are connected into the cable and placed in the water.

For this reason, it is desirable to place a temperature telltale inside each packing crate so that it will be exposed to the same temperature variations as the repeaters and the equalizers. When these crates eventually reach their destination, they are opened and the temperature telltales inspected. If the telltales provide an indication that they have been subjected to a temperature outside their thermal range, it is assumed that their associated repeaters and equalizers have become damaged and will not function properly. These dmaged repeaters and equalizers are returned to the factory for repair and only undamaged repeaters and equalizers are connected into a cable.

Accordingly, it is an object of this invention to provide an improved temperature telltale.

More specifically, it is an object of this invention to provide improved means for indicating the occurrence of a rise in temperature above an assigned upper thermal point and also for indicating the occurrence of a drop in temperature below an assigned lower thermal point.

A further object of the invention is to provide a temperature telltale with improved means for furnishing a plurality of indications of the occurrence of a temperature outside an assigned thermal range.

These and other objects of the invention are obtained by utilizing a temperature telltale comprising a hollow, transparent body member having a middle compartment and two end compartments. One of the end compartments is provided with movable members at its opposite ends for normally retaining a fluid therein. These movable members are interconnected by a rigid instrumentality which causes them to move in tandem. The middle compartment contains a fluid having a freezing point corresponding to an assigned lower temperature. When this fluid freezes, its resulting expansion pushes the movable members thereby opening the first compartment so that the first fluid can escape therefrom thus indicating that the temperature has dropped to this assigned lower thermal point.

The other end compartment contains a third fluid having a color different from the second fluid. These two fluids are normally separated by a partition having a portion thereof made of fusible material which has a melting point corresponding to an assigned upper temperature. When this fusible material melts, its resulting liquefaction permits the commingling of the differently colored fluids thus indicating that the temperature has risen to this assigned upper thermal point. It should be noted that the response time of this telltale can be varied or adjusted as is described in detail hereinafter.

These and other features of the invention are more fully discussed in connection with the following detailed description of the drawing, in which:

FIG. 1 is a sectional side view of an improved temperature telltale in accordance with this invention and showing its components in their normally unoperated condition;

FIG. 2 is a sectional side view of the improved temperature telltale with its components shown in the condition caused by the occurrence of a temperature above an assigned upper thermal point;

FIG. 3 is a sectional side view of the improved temperature telltale with its components shown in the condition produced by the occurrence of a temperature below an assigned lower thermal point; and FIGS. 4 and 5 are perspective views of partition components of the improved temperature telltale.

In FIG. 1, an illustrative embodiment of the invention is represented as having a hollow body member 1 of a suitable transparent material, such as glass. The body member 1 may conveniently be made in the form of a cylindrical tube approximately 13 millimeters in diameter and 100 millimeters long and having a closed end and an open end. The interior of the body member 1 is divided into a middle compartment and two end compartments by means of two partition members 2 and 3 made of any suitable material, such as rubber.

The partition members 2 and 3 are illustrated in perspective in FIGS. 4 and 5, respectively. In FIG. 4 the partition member 2 is shown to be provided with a central opening or bore 4 having a relatively large diameter. The other partition member 3 is shown in FIG. 5 to be provided with a central bore 5 having a relatively small diameter. The outside diameters of the partition members 2 and 3 are so selected as to cause the members 2 and 3 to fit tightly inside the body member 1. Preferably, the partition members 2 and 3 may have their outer surfaces tapered for reasons that are discussed hereinafter. In this embodiment of the invention, the partition member 2 has a thickness of 0.20 inch and the partition member 3 has a thickness of 0.30 inch.

The components of this temperature telltale are assembled in a manner that will now be described. Firstly, the body member 1 is held in a vertical position with its open end uppermost. Next, a liquid 6 is poured into the body member 1 until the lower third of the body member 1 is filled.

This liquid 6 is selected to have a freezing point corresponding to an assigned lower thermal point which, in this exemplary embodiment of the invention, is 0° F. In addition, the fluid 6 has the characteristic of expanding in volume when frozen. A suitable liquid which fulfills these requirements is a eutectic solution of ammonium chloride. Since the ammonium chloride solution has no color in its natural condition, a dye is added to it. This dye may be any appropriate material which will not limit nor impede the expansion of the solution on freezing and which will give it a distinctive color, such as red.

The partition member 2, which is tapered as was stated above, now has its smaller end inserted into the tubular body member 1 so that the direction of its taper will facilitate its movement into the tube 1. The partition member 2 is then forced down inside the tube 1 to a position approximately 0.10 inch above the surface of the red liquid 6. During the time that the member 2 is being pushed down inside the tube 1, the central bore 4 in the member 2 permits the escape of air from the interior of the tube 1. This movement of the partition member 2 is aided by first covering its circumferential surface with a coating of a suitable grease which also has sealing properties for preventing escape of the fluid 6.

With the partition member 2 in this position, a molten material 7 is poured into the tube 1. The material 7 is selected to have a melting point corresponding to an assigned upper thermal point which, in this example of the invention, is 125° F. A suitable fusible material for this purpose is a wax that is adapted to liquefy at this temperature. The molten material 7 passes through the central bore 4 in the partion member 2 and flows into the above-mentioned narrow space between the surface of the red liquid 6 and the bottom of the partition member 2.

The amount of the material 7 that is used is sufficient to fill the space above the liquid 6, the space in the bore 4, and also to form a layer approximately 0.10 inch above the top of the partition member 2. If desired, heat may be applied externally to the tube 1 for the purpose of maintaining the fluidity of the material 7 while it is in the process of filling these spaces. When the material 7 subsequently cools and solidifies, it forms a plug which has a thickness of about 0.40 inch in its center. Thus, the red liquid 6 is held inside an end compartment which is defined by the closed end of the body member 1, the lower third portion of the tubular body member 1, and the partition comprising the partition member 2 together with the solidified fusible material 7.

While the body member 1 is still held in a vertical position, another liquid 8 is poured into the middle third of the body member 1. This fluid 8 has the characteristic of expanding in volume when frozen and is selected to have a freezing point corresponding to the assigned lower thermal point which, as was stated above, is 0° F. in this embodiment of the invention. It is convenient to use for the liquid 8 the same solution of ammonium chloride that was used for the first liquid 6. However, it is desirable that the two liquids 6 and 8 have distinctively different colors for the purpose of visually distinguishing between them. Accordingly, no dye is added to the liquid 8 which is left in its natural colorless condition.

The circumferential surface of the other partition member 3 is now coated with the grease mentioned above. The member 3 is then inserted into the body member 1 and is forced down to the surface of the colorless fluid 8. In performing this operation, the partition member 3, which is tapered as was stated above, has its larger end inserted into the tube 1 first so that the direction of its taper will point toward the open end of the tube 1 for facilitating subsequent movement of the partition member 3 in this direction as is described hereinafter. It should be noted that, while the partition member 3 is being initially pushed down inside the tube 1, the central bore 5 in the member 3 permits the escape of air from the interior of the tube 1.

Next, a suitable rigid instrumentality, such as a screw 9, has its pointed end inserted into the central bore 5 which, as was stated above, has a relatively small diameter. The screw 9 is driven into the tube 1 until its head is partly inside the open end of the tube 1. The threads of the screw 9 are first coated with the above-mentioned grease for making a seal between the screw 9 and the partition member 3 so as to prevent leakage of the colorless liquid 8. Thus, the colorless liquid 8 is held inside the middle compartment which is defined by the first partition 2–7 described above, the middle third portion of the tubular body member 1, and the partition comprising the partition member 3 together with the pointed end of the screw 9.

With the body member 1 still being held in a vertical position, a liquid 10 is poured into the upper third of the body member 1. This fluid 10 is selected to have a freezing point substantially lower than the assigned lower thermal point. It is desirable that the liquid 10 have a color which is distinctively different from the colors of the liquids 6 and 8. A liquid suitable for this purpose is a solution of cupric chloride which has a freezing point of −25° F. and which has a natural color of dark green. The amount of the fluid 10 that is used is sufficient to fill this portion of the tube 1 to within about 0.08 inch from the open end of the tube 1.

A molten material 11 is now poured over the surface of the liquid 10. This material 11 is selected to have a melting point substantially higher than the assigned upper thermal point which, as was stated above, is 125° F. A suitable fusible material for this purpose is a wax that has a melting point of 145° F. The amount of the material 11 that is used is sufficient to cover the surface of the green liquid 10 and to extend about 0.07 inch above the top of the tube 1. During this operation, some of the molten wax 11 may flow down over the outside portion of the tube 1 as is indicated in the drawing. When the material 11 subsequently cools and solidifies, it forms a seal or closure which has a thickness of about 0.15 inch in its center.

It is to be noted that the head of the screw 9 is completely embedded in the wax 11 thereby connecting the wax closure 11 in tandem with the second partition member 3 identified above. Thus, the top of the tube 1 is provided with a closure which is movable as is explained hereinafter. However, at this point, the green liquid 10 is held inside this end compartment which is defined by the second partition identified above, the upper third portion of the tubular body member 1, and the closure comprising the material 11 together with the head of the screw 9.

In view of the above description of the components of this temperature telltale, it can be understood that the device is relatively inexpensive and that it does not require any delicate nor complicated components. Since the wax closure 11 and the partitions 2 and 3 adhere tightly to the tubular body member 1, the telltale is not adversely affected by shocks or vibration. It can easily be mounted close to the particular equipment which is to be monitored. Furthermore, the device does not need to be mounted in any particular position because it can operate equally satisfactorily in a vertical position, a horizontal position, or in any other position.

For example, let it be assumed that the telltale is in a horizontal position as is shown in the drawing. Let it be further assumed that the telltale is subjected to a rise in temperature above the upper thermal point 125° F. Accordingly, the fusible material constituted by the wax plug 7 in the bore 4 of the partition member 2 will become liquefied. When the wax 7 melts, it moves out of the bore 4 and rises upward in both the above-mentioned first and second compartments of the tubular body member 1 as is indicated by the reference numeral 7' in FIG. 2.

The liquefaction of the wax 7 serves to clear the passage through the bore 4 thus removing the barrier between the red liquid 6 and the colorless liquid 8. Since the only difference between the liquids 6 and 8 is the presence of the red dye in the liquid 6, it is evident that they have substantially the same specific gravity. Accordingly, they will gradually become commingled so that both the bottom and the middle compartments of the tube 1 will now contain liquid having the red color as is indicated by the reference numerals 6'–8' in FIG. 2.

Thus, the telltale actually produces two indications that there has been an occurrence of a temperature rise above the assigned thermal range. One indication is effected by the melting of the wax barrier 7 because, when it becomes liquefied, it flows out of the bore 4 and moves to a different position inside the body member 1.

Since the telltale is not examined until its monitored equipment is to be used, the temperature at that time is usually within the assigned thermal range. Accordingly, the wax 7 will have risen to the top of the liquid 6'–8' and will have become solidified but will be in a new location inside the tube 1. For example, if the tube 1 has been in an upright position, the wax 7 will have solidified into a mass located next to the bottom of the partition member 3. This new position of the wax 7 can be readily observed due to the fact that the tube 1 is made of glass.

The other indication is effected by the commingling of the differently colored liquids 6 and 8. This indication can be easily observed because the bottom compartment and the middle compartment, instead of having two distinctively different colors, will now have the same color.

Since the liquids 6 and 8 thus become commingled, it is evident that the red dye could have initially been mixed with the liquid 8 instead of with the liquid 6 which would then have been colorless. However, this is a matter of preference and it was considered that, by having the middle compartment colorless, the telltale presents more contrast in its unoperated condition, as shown in FIG. 1.

Now let it be assumed that, when the telltale is in its unoperated condition, it is subjected to a drop in temperature below the assigned lower thermal point which, in this example, is 0° F. Accordingly, both the red liquid 6 and the colorless liquid 8 will freeze. This causes these ammonium chloride solutions to become crystalline and to expand in volume. Since the green liquid 10, which is a cupric chloride solution, has a lower freezing point of about —25° F., it remains in a liquid condition at this time.

The expansion of the ammonium chloride 8 in the middle compartment creates pressure acting against the partition members 2 and 3. At the same time, the expansion of the ammonium chloride 6 in the end compartment produces pressure against the other side of the partition member 2. Due to the cupric chloride 10 being still in a liquid condition, there is no such pressure exerted against the other side of the partition member 3. The result of these conditions is that the partition member 3 is forced to move torward the right in FIG. 1. This movement of the partition member 3 is facilitated to a certain extent by the fact that, when it was initially inserted into the tube 1, its larger end was inserted first so that the direction of its taper points toward the right end of the tube 1, as was described above.

Since the partition member 3 is connected in tandem with the wax closure 11 by means of the screw 9, the sliding movement of the partition 3 is consequently accompanied by corresponding movement of the wax closure 11. In other words, the expansion of the freezing material 8 in the middle compartment ultimately effects the movement of the wax closure 11. Accordingly, the wax closure 11 now moves away from the end of the tube 1 as is shown in FIG. 3 thereby permitting the green liquid 10 to escape from this end compartment of the tube 1.

Thus, when the telltale is subsequently examined, there will be two indications that there has been an occurrence of a temperature drop below the assigned thermal range. One indication is effected by the rupturing of the wax seal 11. This is readily apparent because the wax 11 now protrudes beyond the end of the tube 1 so that there is a gap, indicated by the reference numeral 12 in FIG. 3, between the wax 11 and the end of the tube 1.

The other indication is effected by the loss of the liquid 10 from the tube 1. For example, if the tube 1 is in a horizontal position, as is shown in the drawing, then the breaking of the wax seal 11 will cause the entire amount of the green liquid 10 to escape from the tube 1. This will be clearly noticeable because the compartment at this end of the tube 1 will now have lost its green color. If the tube 1 had been kept in a vertical position, the movement of the partition member 3 would force some of the green liquid 10 out of the tube 1. A certain amount of the liquid 10 might be retained in the lower portion of this top compartment but most of it will escape due to the fact that the tube 1 will ordinarily be subjected to a certain amount of shaking during the time that it is being transported.

Another feature of this telltale is that its operation is characterized by having a time delay which can be varied as desired. In other words, its response time can be varied or adjusted. The response time of the telltale is defined as the length of time which elapses between the exposure of the device to a temperature outside the assigned thermal range and the rendering by the device of an indication of the occurrence of this temperature.

This is a desirable feature because the purpose of this telltale is to furnish information for determining whether the associated equipment, such as the repeaters and equalizers mentioned above, have been damaged by exposure to excessively high or low temperatures. It can be understood that, in many instances, the equipment that is to be monitored may be so constructed that it can safely withstand an excessively high or low temperature for a brief period of time. In such cases, the mere indication that an excessive temperature has occurred is not particularly useful because the excessive temperature may have been of such brief duration that it did not damage the monitored equipment. Accordingly, it is more useful for the telltale to be so arranged as to delay its response for a brief period of time. Since the length of this delay period is, in part, a function of the amount or extent by which the temperature limits have been exceeded, the delay period should be so selected or adjusted as to provide proper protection for the particular type of equipment that is to be monitored.

One way in which the response time of the telltale can be adjusted is to change the diameter of the tube 1 so as to produce a corresponding change in the amount of liquid contained in each compartment and thereby change the total capacity of the device for absorbing heat. For example, if the diameter of the tube 1 is made larger, then the percentage of the increase in the volume of the liquids will be larger than the percentage of the increase in the surface area that is available for heat transfer from the environment. This will produce an increase in the thermal time constant so that more time will be required to transfer the environmental temperature to the liquids thus effecting an increase in the response time of the telltale to either upper or lower thermal extremes.

Alternatively, the response of the telltale to a rise in temperature can be readily adjusted by varying the amount of wax 7 used with the partition member 2. For example, if the wax plug 7 is made thicker, then a longer melting period will be required to effect the movement of the wax 7 out of the bore 4 to permit the commingling of the differently colored liquids 6 and 8.

What is claimed is:

1. A temperature telltale comprising a body having a middle compartment and two end compartments, a first fluid normally in a first one of said end compartments, movable members at opposite ends of said first end compartment for normally retaining said first fluid therein, a rigid instrumentality for interconnecting said movable members for movement in tandem, first means responsive to the occurrence of an assigned lower temperature for moving said movable members and opening said first end compartment for effecting the escape therefrom of at least a portion of said first fluid, a second fluid in said middle compartment, a third fluid in said second end compartment having a color different from said second fluid, and second means responsive to the occurrence of an assigned upper temperature for effecting the commingling of said differently colored second and third fluids.

2. A temperature telltale comprising a body having a moddle compartment and two end compartments, a first fluid normally in a first one of said end compartments, movable members at opposite ends of said first end compartment for normally retaining said first fluid therein, a rigid instrumentality for interconnecting said movable members for movement in tandem, first means responsive to the occurrence of an assigned lower temperature for opening said first end compartment for effecting the escape therefrom of at least a portion of said first fluid, said first means including a second fluid in said middle compartment having a freezing point corresponding to said assigned lower temperature and adapted while freezing to expand against at least one of said interconnected movable members for producing movement of both of said movable members, a third fluid in said second end compartment having a color different from said second fluid, and second means responsive to the occurrence of an assigned upper temperature for effecting the commingling of said differently colored second and third fluids, said second means comprising a partition in said body and having at least a portion thereof made of fusible material for normally separating said second and third fluids, and said fusible material having a melting point corresponding to said assigned upper temperature and adapted when liquefied to discontinue said separation of said second and third fluids.

3. A temperature telltale adapted for indicating the occurrence of a temperature rise above an assigned upper thermal point and also for indicating the occurrence of a temperature drop below an assigned lower thermal point, said telltale comprising a cylindrical glass tube having a closed end and an open end, a movable closure for said open end, first and second partitions inserted in said tube for forming three compartments, the first of said compartments being defined by said tube together with its closed end and said first partition, the second of said compartments being defined by said tube together with said first and second partitions, the third of said compartments being defined by said tube together with said second partition and said movable closure, said second partition being adapted to slide within said tube, a first fluid in said third compartment having a freezing point substantially lower than said assigned lower thermal point, a second fluid in said second compartment having a freezing point corresponding to said assigned lower thermal point and adapted to expand in volume while freezing for producing sliding movement of said second partition, a rigid instrumentality connecting said movable closure to said second partition for movement therewith whereby said movable closure is moved away from said open end of said tube to permit the escape of at least part of said first fluid from said third compartment, a third fluid in said first compartment, a dye added to one of said second and third fluids for visually distinguishing between them, and at least a portion of said first partition being made of fusible material having a melting point corresponding to said assigned upper thermal point and adapted to liquefy when melted for effecting the commingling of said second and third fluids.

4. A temperature telltale responsive to the occurrence of a temperature outside an assigned thermal range for providing a plurality of indications thereof, said telltale comprising two liquids each colored differently from the other, separating means for normally separating said liquids, said separating means including a fusible material normally in a fixed position in said telltale and having a melting point corresponding to the high temperature point of said assigned thermal range, said fusible material being adapted when melted to furnish an indication of the occurrence of said high temperature by moving out of said fixed position to another position, said liquids being adapted to commingle in response to said movement of said fusible material and to blend their colors for producing another indication of the occurrence of said high temperature, said telltale further comprising a third liquid having a freezing point lower than said two liquids, a first movable member at least partly in said telltale for normally retaining said third liquid in said telltale, a second movable member for normally separating said third liquid from at least one of said two liquids, means for connecting said movable members for movement in tandem, said two liquids having freezing points corresponding to the low temperature point of said assigned thermal range and at least one of said two liquids being adapted when frozen to expand against said second movable member for effecting movement of both of said movable members, said first movable member being adapted to move out of said telltale in response to said expansion movement for producing an indication of the occurrence of said low temperature, and at least part of said third liquid being adapted to escape from said telltale in response to said movement of said movable members for providing another indication of the occurrence of said low temperature.

References Cited by the Examiner

UNITED STATES PATENTS 3,090,236   5/1963   Nicol _____ 73—358

LOUIS R. PRINCE, *Primary Examiner.*